(12) United States Patent
Duzly et al.

(10) Patent No.: US 10,289,557 B2
(45) Date of Patent: May 14, 2019

(54) STORAGE SYSTEM AND METHOD FOR FAST LOOKUP IN A TABLE-CACHING DATABASE

(71) Applicant: Western Digital Technologies, Inc., San Jose, CA (US)

(72) Inventors: Yacov Duzly, Ra'anana (IL); Hadas Oshinsky, Kfar Saba (IL)

(73) Assignee: Western Digital Technologies, Inc., San Jose, CA (US)

( * ) Notice: Subject to any disclaimer, the term of this patent is extended or adjusted under 35 U.S.C. 154(b) by 0 days.

(21) Appl. No.: 15/688,095

(22) Filed: Aug. 28, 2017

(65) Prior Publication Data

US 2019/0065387 A1 Feb. 28, 2019

(51) Int. Cl.
| | | |
|---|---|---|
| *G06F 12/08* | (2016.01) |
| *G06F 12/0884* | (2016.01) |
| *G06F 3/06* | (2006.01) |
| *G06F 16/172* | (2019.01) |
| *G06F 16/901* | (2019.01) |

(52) U.S. Cl.
CPC ........ *G06F 12/0884* (2013.01); *G06F 3/0611* (2013.01); *G06F 16/172* (2019.01); *G06F 16/9017* (2019.01)

(58) Field of Classification Search
None
See application file for complete search history.

(56) References Cited

U.S. PATENT DOCUMENTS

| | | | |
|---|---|---|---|
| 5,930,833 A | 7/1999 | Yoshioka et al. | |
| 8,458,435 B1 * | 6/2013 | Rainey, III | G06F 12/0246 711/103 |
| 9,189,392 B1 * | 11/2015 | Neppalli | G06F 3/064 |
| 9,514,057 B2 | 12/2016 | Marcu et al. | |
| 2008/0126683 A1 * | 5/2008 | Tsuji | G06F 12/0246 711/103 |
| 2011/0022819 A1 | 1/2011 | Post et al. | |
| 2011/0119455 A1 | 5/2011 | Tsai et al. | |
| 2012/0290798 A1 | 11/2012 | Huang et al. | |
| 2013/0246689 A1 * | 9/2013 | Matsudaira | G06F 12/0246 711/103 |
| 2017/0177497 A1 * | 6/2017 | Chun | G06F 12/0802 |
| 2018/0189000 A1 * | 7/2018 | Li | G06F 3/0661 |

* cited by examiner

*Primary Examiner* — Kevin Verbrugge
(74) *Attorney, Agent, or Firm* — Brinks Gilson & Lione

(57) ABSTRACT

A storage system and method for fast lookup in a table-caching database are provided. In one embodiment, a storage system is provided comprising a volatile memory, a non-volatile memory, and a controller. The controller is configured to store, in the volatile memory, a data structure representing a compressed version of a logical-to-physical address table stored in the non-volatile memory; and search the data structure for a physical address associated with a logical address, wherein the controller is configured to find any physical address in the data structure in a fixed amount of time. Other embodiments are provided.

13 Claims, 11 Drawing Sheets

STORAGE SYSTEM AND METHOD FOR FAST LOOKUP IN A TABLE-CACHING DATABASE

BACKGROUND

Many storage systems use a logical-to-physical address table to convert a logical address received from a host in a read or write command to a physical address in non-volatile memory where data is to be read from or written to. The logical-to-physical address table is often stored in the non-volatile memory, but as searching the table in non-volatile memory can be time-consuming, some storage systems move the table from non-volatile memory to volatile memory (e.g., RAM), where the table can be searched faster. If the non-volatile memory space being mapped is small enough, the entire logical-to-physical address table can be cached in the volatile memory. However, when the memory space is very large, the logical-to-physical address table is very large and may not be able to be loaded in its entirety in volatile memory. Therefore, only a portion can be loaded, which means that, in many instances, the relevant entries in the table are still in non-volatile memory. This excessive read to search the table in non-volatile memory is sometimes called a control read and can degrade random read performance, which is an important metric for storage devices in general and embedded devices specifically. Additional volatile memory can be added to a storage system to address this problem, but this can increase the expense and size of the storage system's controller. Some storage systems use compressed table caching mechanisms and algorithms that allows almost zero control reads in several use cases, such as sequential precondition.

DETAILED DESCRIPTION

Overview

Figure 1A:
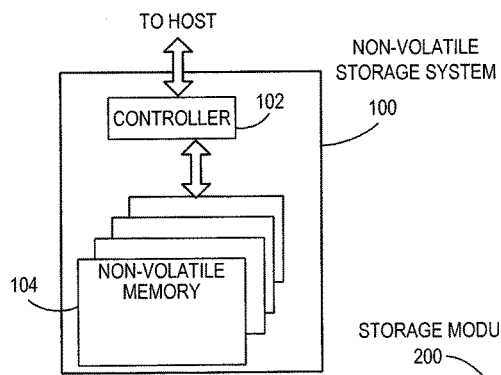
FIG. 1A is a block diagram of a non-volatile storage system of an embodiment.

By way of introduction, the below embodiments relate to a storage system and method for fast lookup in a table-caching database. In one embodiment, a storages system is provided comprising a volatile memory, a non-volatile memory, and controller in communication with the volatile memory and the non-volatile memory. The controller is configured to store, in the volatile memory, a data structure representing a compressed version of a logical-to-physical address table stored in the non-volatile memory; and search the data structure for a physical address associated with a logical address, wherein the controller is configured to find any physical address in the data structure in a fixed amount of time.

In some embodiments, each entry in the data structure comprises a start physical address and start and end logical addresses for a sequential run of logical addresses, and wherein the controller is further configured to search each of the entries of the data structure in parallel.

In some embodiments, the controller is further configured to: determine whether the logical address is found in an entry by determining whether the logical address is between the start and end logical addresses of the entry; and in response to determining that the logical address is between the start and end logical addresses of the entry: subtract the start logical address from the logical address; divide by a number of entries in the data structure; and add the start physical address.

In some embodiments, each entry in the data structure comprises a start physical address, physical address run length and start logical addresses for a sequential run of logical addresses, and wherein the controller is further configured to search each of the entries of the data structure in parallel.

In some embodiments, the non-volatile memory comprises a three-dimensional memory.

In some embodiments, the storage system is embedded in a host.

In some embodiments, the storage system is removably connected to a host.

In another embodiment, a method for searching a cached, compressed database representing a logical-to-physical address table is provided. The method is performed in a storage system comprising a volatile memory. The method comprises caching, in the volatile memory, a compressed database representing a logical-to-physical address table; searching each entry in the cached, compressed database in parallel for a logical address, wherein each entry requires a same amount of time to search; and determining a physical address associated with the logical address.

In some embodiments, each entry in the cached, compressed database comprises a start physical address and start and end logical addresses for a sequential run of logical addresses.

In some embodiments, each entry in the cached, compressed database is searched by: determining whether the logical address is between the start and end logical addresses of the entry; and in response to determining that the logical address is between the start and end logical addresses of the entry: subtracting the start logical address from the logical address; dividing by a number of entries in the cached, compressed database; and adding the start physical address.

In some embodiments, each entry in the data structure comprises a start physical address, physical address run length and start logical addresses for a sequential run of logical addresses, and wherein the controller is further configured to search each of the entries of the data structure in parallel.

In some embodiments, the non-volatile memory comprises a three-dimensional memory.

In some embodiments, the storage system is embedded in a host.

In some embodiments, the storage system is removably connected to a host.

In another embodiment, a storage system is provided comprising a memory; and means for searching a data structure stored in the memory for a logical address, wherein the data structure stored in the memory represents a logical-to-physical address table, and wherein the searching is done in a deterministic time.

In some embodiments, the means is configured to search each entry in the data structure in parallel.

In some embodiments, each entry in the data structure comprises a start physical address and start and end logical addresses for a sequential run of logical addresses.

In some embodiments, each entry in the data structure comprises a start physical address, physical address run length and start logical addresses for a sequential run of logical addresses, and wherein the controller is further configured to search each of the entries of the data structure in parallel.

In some embodiments, the means comprises a plurality of search circuitry in communication with a decoder and a multiplexor, wherein each entry of the data structure is associated with its own search circuitry.

In some embodiments, at least one search circuitry comprises a comparator, an AND gate, a subtractor, a divider, and an adder.

In some embodiments, the non-volatile memory comprises a three-dimensional memory.

In some embodiments, the storage system is embedded in a host.

In some embodiments, the storage system is removably connected to a host.

Other embodiments are possible, and each of the embodiments can be used alone or together in combination. Accordingly, various embodiments will now be described with reference to the attached drawings.

Embodiments

Figure 1B:
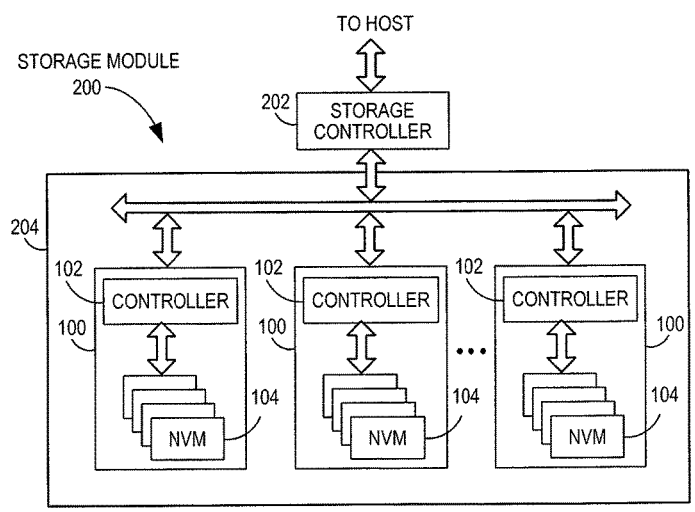
FIG. 1B is a block diagram illustrating a storage module of an embodiment.
Figure 1C:
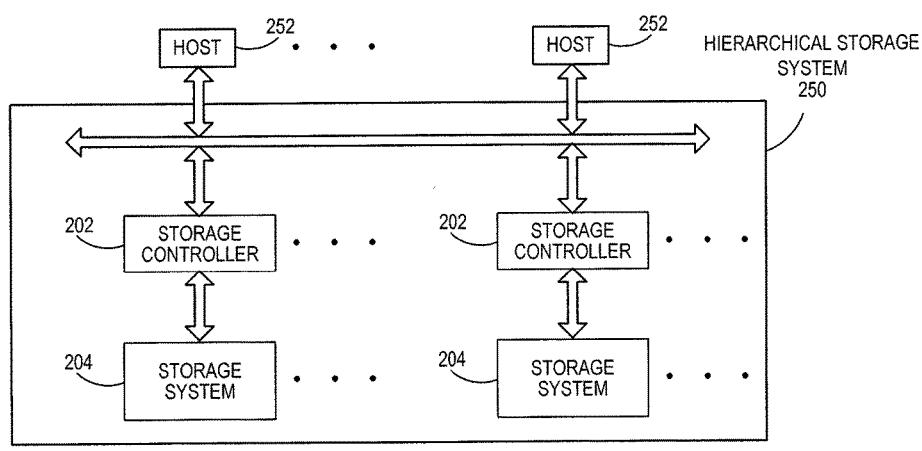
FIG. 1C is a block diagram illustrating a hierarchical storage system of an embodiment.

Storage systems suitable for use in implementing aspects of these embodiments are shown in FIGS. 1A-1C. FIG. 1A is a block diagram illustrating a non-volatile storage system 100 according to an embodiment of the subject matter described herein. Referring to FIG. 1A, non-volatile storage system 100 includes a controller 102 and non-volatile memory that may be made up of one or more non-volatile memory die 104. As used herein, the term die refers to the collection of non-volatile memory cells, and associated circuitry for managing the physical operation of those non-volatile memory cells, that are formed on a single semiconductor substrate. Controller 102 interfaces with a host system and transmits command sequences for read, program, and erase operations to non-volatile memory die 104.

The controller 102 (which may be a non-volatile memory controller (e.g., a flash, Re-RAM, PCM, or MRAM controller)) can take the form of processing circuitry, a microprocessor or processor, and a computer-readable medium that stores computer-readable program code (e.g., firmware) executable by the (micro)processor, logic gates, switches, an application specific integrated circuit (ASIC), a programmable logic controller, and an embedded microcontroller, for example. The controller 102 can be configured with hardware and/or firmware to perform the various functions described below and shown in the flow diagrams. Also, some of the components shown as being internal to the controller can also be stored external to the controller, and other components can be used. Additionally, the phrase "operatively in communication with" could mean directly in communication with or indirectly (wired or wireless) in communication with through one or more components, which may or may not be shown or described herein.

As used herein, a non-volatile memory controller is a device that manages data stored on non-volatile memory and communicates with a host, such as a computer or electronic device. A non-volatile memory controller can have various functionality in addition to the specific functionality described herein. For example, the non-volatile memory controller can format the non-volatile memory to ensure the memory is operating properly, map out bad non-volatile memory cells, and allocate spare cells to be substituted for future failed cells. Some part of the spare cells can be used to hold firmware to operate the non-volatile memory controller and implement other features. In operation, when a host needs to read data from or write data to the non-volatile memory, it can communicate with the non-volatile memory controller. If the host provides a logical address to which data is to be read/written, the non-volatile memory controller can convert the logical address received from the host to a physical address in the non-volatile memory. (Alternatively, the host can provide the physical address.) The non-volatile memory controller can also perform various memory management functions, such as, but not limited to, wear leveling (distributing writes to avoid wearing out specific blocks of memory that would otherwise be repeatedly written to) and garbage collection (after a block is full, moving only the valid pages of data to a new block, so the full block can be erased and reused).

Non-volatile memory die 104 may include any suitable non-volatile storage medium, including resistive random-access memory (ReRAM), magnetoresistive random-access memory (MRAM), phase-change memory (PCM), NAND flash memory cells and/or NOR flash memory cells. The memory cells can take the form of solid-state (e.g., flash) memory cells and can be one-time programmable, few-time programmable, or many-time programmable. The memory cells can also be single-level cells (SLC), multiple-level cells (MLC), triple-level cells (TLC), or use other memory cell level technologies, now known or later developed. Also, the memory cells can be fabricated in a two-dimensional or three-dimensional fashion.

The interface between controller 102 and non-volatile memory die 104 may be any suitable flash interface, such as Toggle Mode 200, 400, or 800. In one embodiment, storage system 100 may be a card based system, such as a secure digital (SD) or a micro secure digital (micro-SD) card. In an alternate embodiment, storage system 100 may be part of an embedded storage system.

Although, in the example illustrated in FIG. 1A, non-volatile storage system 100 (sometimes referred to herein as a storage module) includes a single channel between controller 102 and non-volatile memory die 104, the subject matter described herein is not limited to having a single memory channel. For example, in some storage system architectures (such as the ones shown in FIGS. 1B and 1C), 2, 4, 8 or more memory channels may exist between the controller and the memory device, depending on controller capabilities. In any of the embodiments described herein, more than a single channel may exist between the controller and the memory die, even if a single channel is shown in the drawings.

FIG. 1B illustrates a storage module 200 that includes plural non-volatile storage systems 100. As such, storage module 200 may include a storage controller 202 that interfaces with a host and with storage system 204, which includes a plurality of non-volatile storage systems 100. The interface between storage controller 202 and non-volatile storage systems 100 may be a bus interface, such as a serial advanced technology attachment (SATA), peripheral component interface express (PCIe) interface, or dual-date-rate (DDR) interface. Storage module 200, in one embodiment, may be a solid state drive (SSD), or non-volatile dual in-line memory module (NVDIMM), such as found in server PC or portable computing devices, such as laptop computers, and tablet computers.

FIG. 1C is a block diagram illustrating a hierarchical storage system. A hierarchical storage system 250 includes a plurality of storage controllers 202, each of which controls a respective storage system 204. Host systems 252 may access memories within the storage system via a bus interface. In one embodiment, the bus interface may be an NVMe or fiber channel over Ethernet (FCoE) interface. In one embodiment, the system illustrated in FIG. 1C may be a rack mountable mass storage system that is accessible by multiple host computers, such as would be found in a data center or other location where mass storage is needed.

Figure 2A:
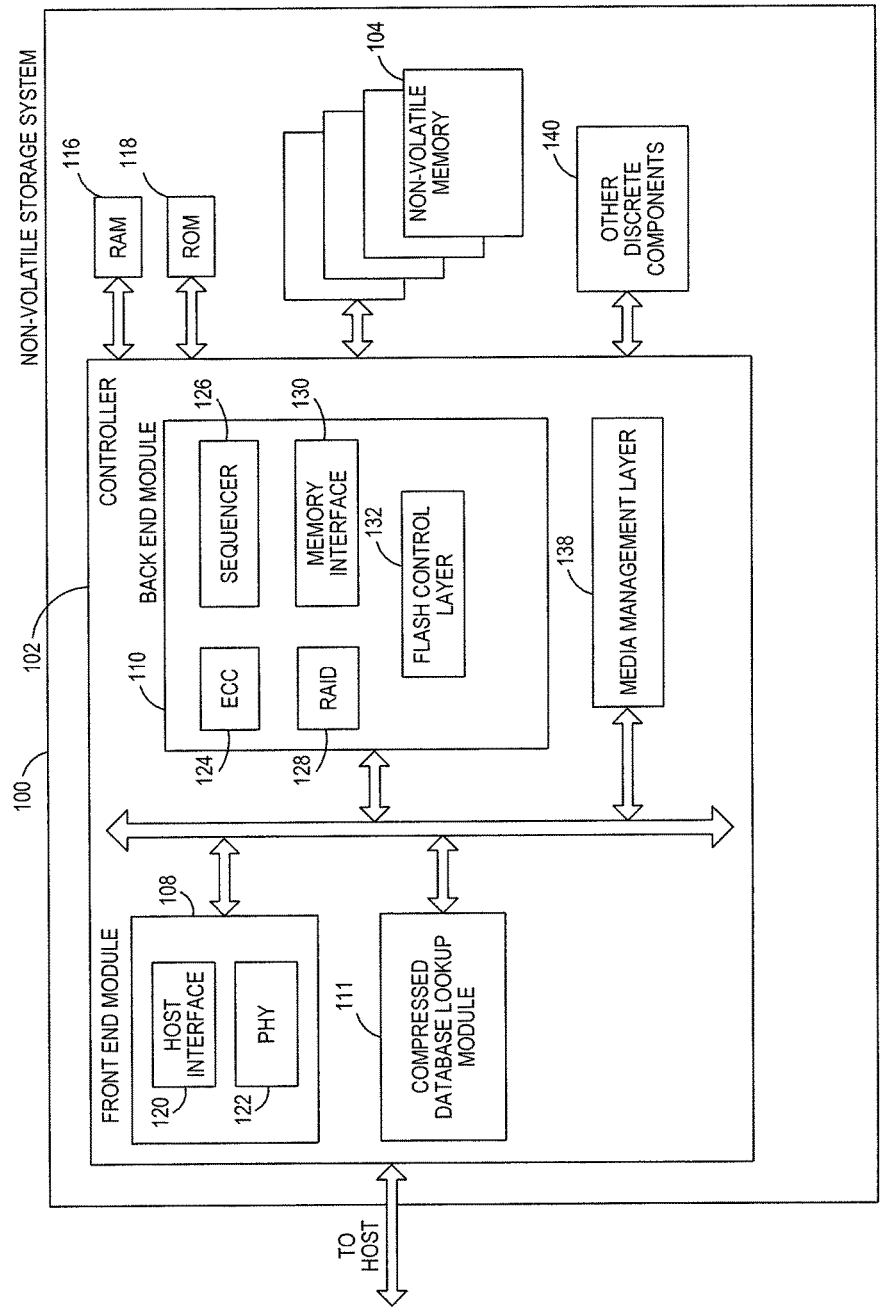
FIG. 2A is a block diagram illustrating components of the controller of the non-volatile storage system illustrated in FIG. 1A according to an embodiment.

FIG. 2A is a block diagram illustrating components of controller 102 in more detail. Controller 102 includes a front end module 108 that interfaces with a host, a back end module 110 that interfaces with the one or more non-volatile memory die 104, and various other modules that perform functions which will now be described in detail. A module may take the form of a packaged functional hardware unit designed for use with other components, a portion of a program code (e.g., software or firmware) executable by a (micro)processor or processing circuitry that usually performs a particular function of related functions, or a self-contained hardware or software component that interfaces with a larger system, for example. Modules of the controller 102 may include a compressed database lookup module 111, which is discussed in more detail below, and can be implemented in hardware or software/firmware. The compressed database lookup module 111 can be configured to perform the algorithms and methods discussed below and shown in the attached drawings.

Referring again to modules of the controller 102, a buffer manager/bus controller 114 manages buffers in random access memory (RAM) 116 and controls the internal bus arbitration of controller 102. A read only memory (ROM) 118 stores system boot code. Although illustrated in FIG. 2A as located separately from the controller 102, in other embodiments one or both of the RAM 116 and ROM 118 may be located within the controller. In yet other embodiments, portions of RAM and ROM may be located both within the controller 102 and outside the controller.

Front end module 108 includes a host interface 120 and a physical layer interface (PHY) 122 that provide the electrical interface with the host or next level storage controller. The choice of the type of host interface 120 can depend on the type of memory being used. Examples of host interfaces 120 include, but are not limited to, e.MMC, UFS, SATA, SATA Express, SAS, Fibre Channel, USB, PCIe, and NVMe. The host interface 120 typically facilitates transfer for data, control signals, and timing signals.

Back end module 110 includes an error correction controller (ECC) engine 124 that encodes the data bytes received from the host, and decodes and error corrects the data bytes read from the non-volatile memory. A command sequencer 126 generates command sequences, such as program and erase command sequences, to be transmitted to non-volatile memory die 104. A RAID (Redundant Array of Independent Drives) module 128 manages generation of RAID parity and recovery of failed data. The RAID parity may be used as an additional level of integrity protection for the data being written into the memory device 104. In some cases, the RAID module 128 may be a part of the ECC engine 124. A memory interface 130 provides the command sequences to non-volatile memory die 104 and receives status information from non-volatile memory die 104. In one embodiment, memory interface 130 may be a double data rate (DDR) interface, such as a Toggle Mode 200, 400, or 800 interface. A flash control layer 132 controls the overall operation of back end module 110.

The storage system 100 also includes other discrete components 140, such as external electrical interfaces, external RAM, resistors, capacitors, or other components that may interface with controller 102. In alternative embodiments, one or more of the physical layer interface 122, RAID module 128, media management layer 138 and buffer management/bus controller 114 are optional components that are not necessary in the controller 102.

Figure 2B:
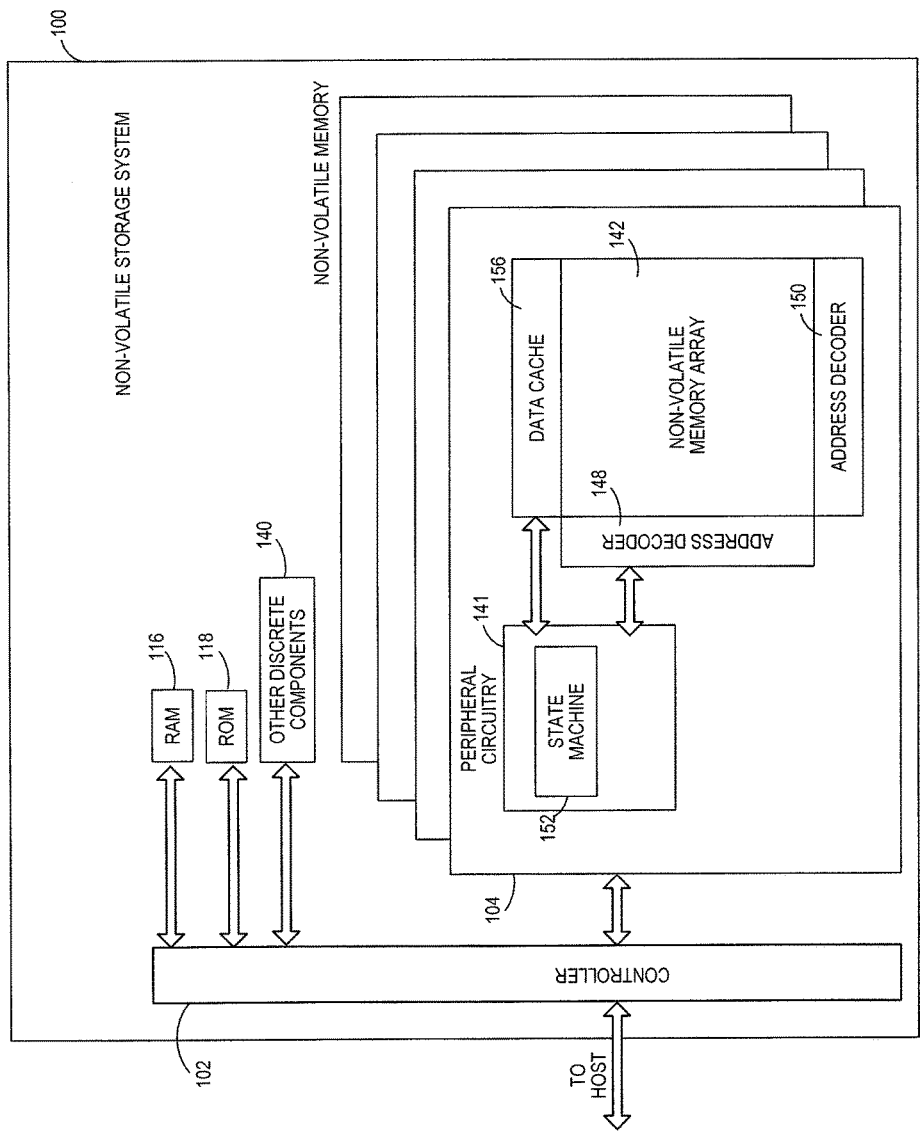
FIG. 2B is a block diagram illustrating components of the non-volatile memory storage system illustrated in FIG. 1A according to an embodiment.

FIG. 2B is a block diagram illustrating components of non-volatile memory die 104 in more detail. Non-volatile memory die 104 includes peripheral circuitry 141 and non-volatile memory array 142. Non-volatile memory array 142 includes the non-volatile memory cells used to store data. The non-volatile memory cells may be any suitable non-volatile memory cells, including ReRAM, MRAM, PCM, NAND flash memory cells and/or NOR flash memory cells in a two dimensional and/or three dimensional configuration. Non-volatile memory die 104 further includes a data cache 156 that caches data. Peripheral circuitry 141 includes a state machine 152 that provides status information to the controller 102.

As noted above, many storage systems use a logical-to-physical address table to convert a logical address received from a host in a read or write command to a physical address in non-volatile memory where data is to be read from or written to. The logical-to-physical address table is often stored in the non-volatile memory (to allow safe power off and power on of the storage), but as searching the table in non-volatile memory can be time-consuming, some storage systems move the table from non-volatile memory to volatile memory (e.g., RAM), where the table can be searched faster. If the non-volatile memory space being mapped is small enough, the entire logical-to-physical address table can be loaded from the non-volatile memory to the volatile memory. However, when the memory space is very large, the logical-to-physical address table is very large and may not be able to be loaded in its entirety in volatile memory. So, only a portion can be loaded, which means that, in many instances, the relevant entries in the table are still in non-volatile memory. This excessive read to search the table in non-volatile memory is sometimes called a control read and can degrade random read performance, which is an important metric for storage devices in general and embedded devices specifically. Additional volatile memory can be added to a storage system to address this problem, but this can increase the expense and size of the storage system's controller. Some storage systems use compressed table caching mechanisms and algorithms that allows almost zero control reads in several use cases, such as sequential precondition. However, these algorithms can be complicated, CPU-intensive, and very slow to implement by firmware.

The following embodiments can be used to provide faster and more-efficient methods of searching and compressing a table-caching database. Before turning to the specifics of these fast and deterministic-in-time search algorithms and techniques, the following paragraphs discuss the use of a compressed database.

As discussed above, the logical-to-physical address table is often stored in the non-volatile memory 104, and, depending on its size, all or a part of the logical-to-physical address table is stored in volatile memory (e.g., RAM 116) in the memory system 100. For simplicity, the term "logical-to-physical-address table" will be used to refer to all or part of the "logical-to-physical-address table." So, when it is said that the logical-to-physical-address table is cached in volatile memory 116, it should be understood that either the entire table is cached in volatile memory 116 or that only a part of the table is cached in volatile memory. Also, the terms "table" and "map" will be used interchangeably herein.

Figure 3:
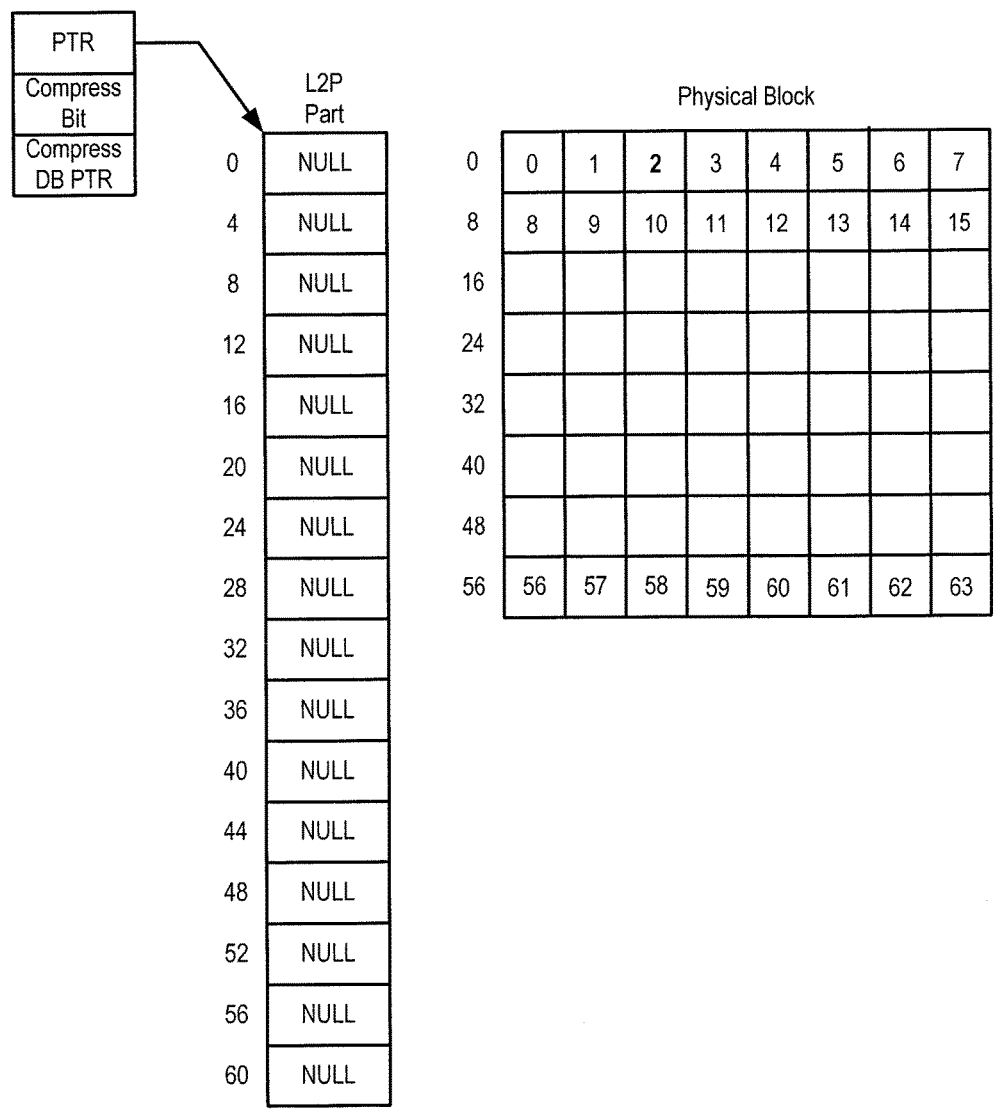
FIG. 3 is an illustration of a logical-to-physical address table and an erased physical block of memory of an embodiment.

Turning again to the drawings, FIG. 3 is an illustration of a logical-to-physical address table and an erased physical block of non-volatile memory 104 of an embodiment. In this embodiment, each physical block in the non-volatile memory 104 has 64 physical locations (e.g., writing units or pages). In this example, each physical location is equivalent to 4 KB. Each physical location is associated with a physical address (labeled 0-63 in the physical block shown in FIG. 3) and can hold the data of four logical addresses. Of course, this is just an example, and the number of physical locations in a memory block and the granularity of logical addresses to physical locations can vary.

FIG. 3 also shows the logical-to-physical address table that is cached in the volatile memory 116 and is associated with the physical block. FIG. 3 refers to this table as the "L2P Part," as the table cached in the volatile memory 116 can be only a part of the logical-to-physical address table that is stored in the non-volatile memory 104. (However, as noted above, the term "logical-to-physical address table," as used herein, can refer to either a part of the table or the entire table). Because each physical location holds data of four logical addresses in this example, each entry in the cached logical-to-physical address table in this example is multiples of four. As the memory block is erased in this example, the logical-to-physical address table is empty, as there is no association between logical and physical addresses yet (i.e., each entry is null). FIG. 3 also shows a pointer to the logical-to-physical address table, a compress bit field, and a compress database pointer. These items will be discussed below.

Figure 4:
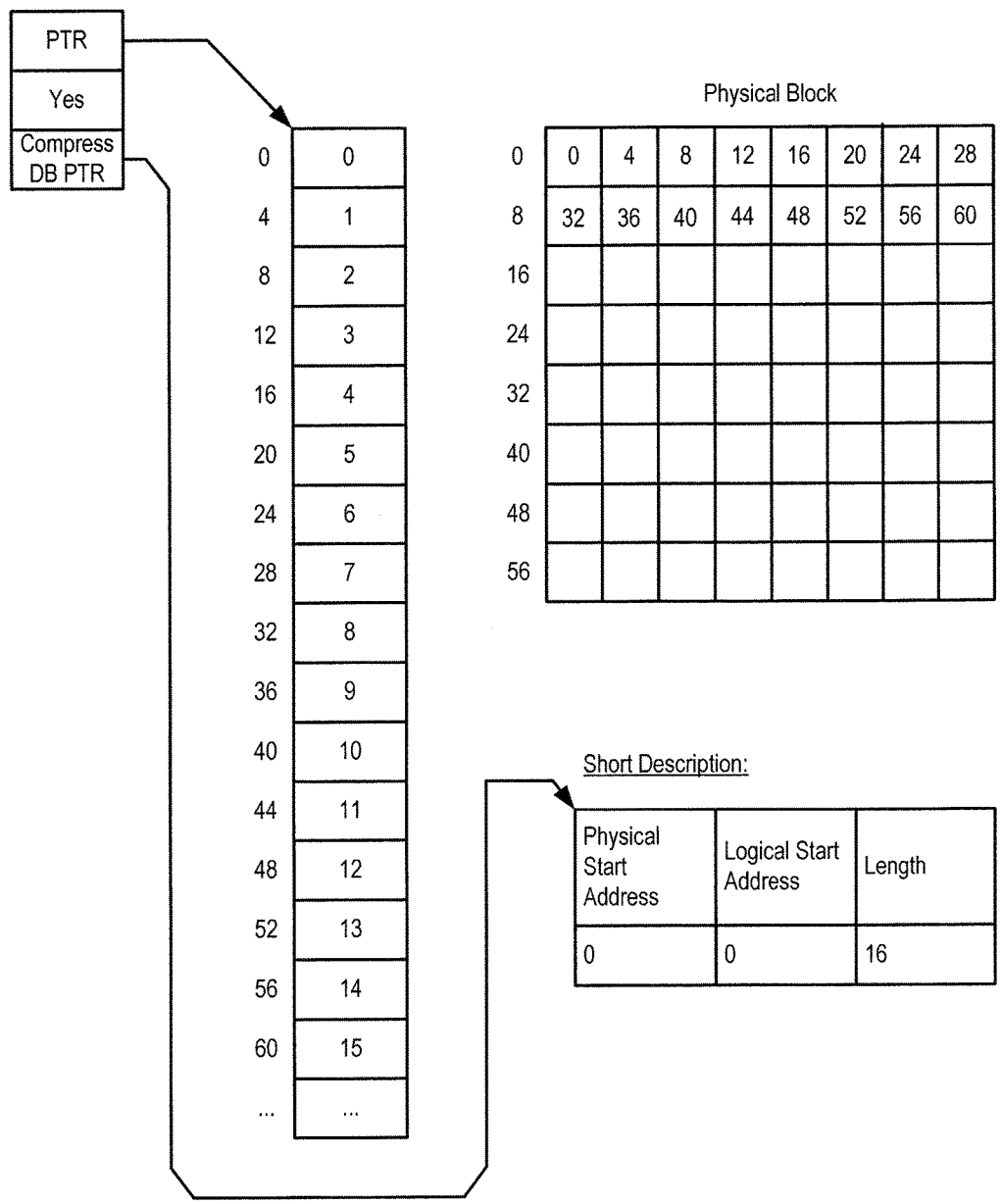
FIG. 4 is an illustration showing a compressed database of an embodiment in a sequential writing situation.
Figure 5:
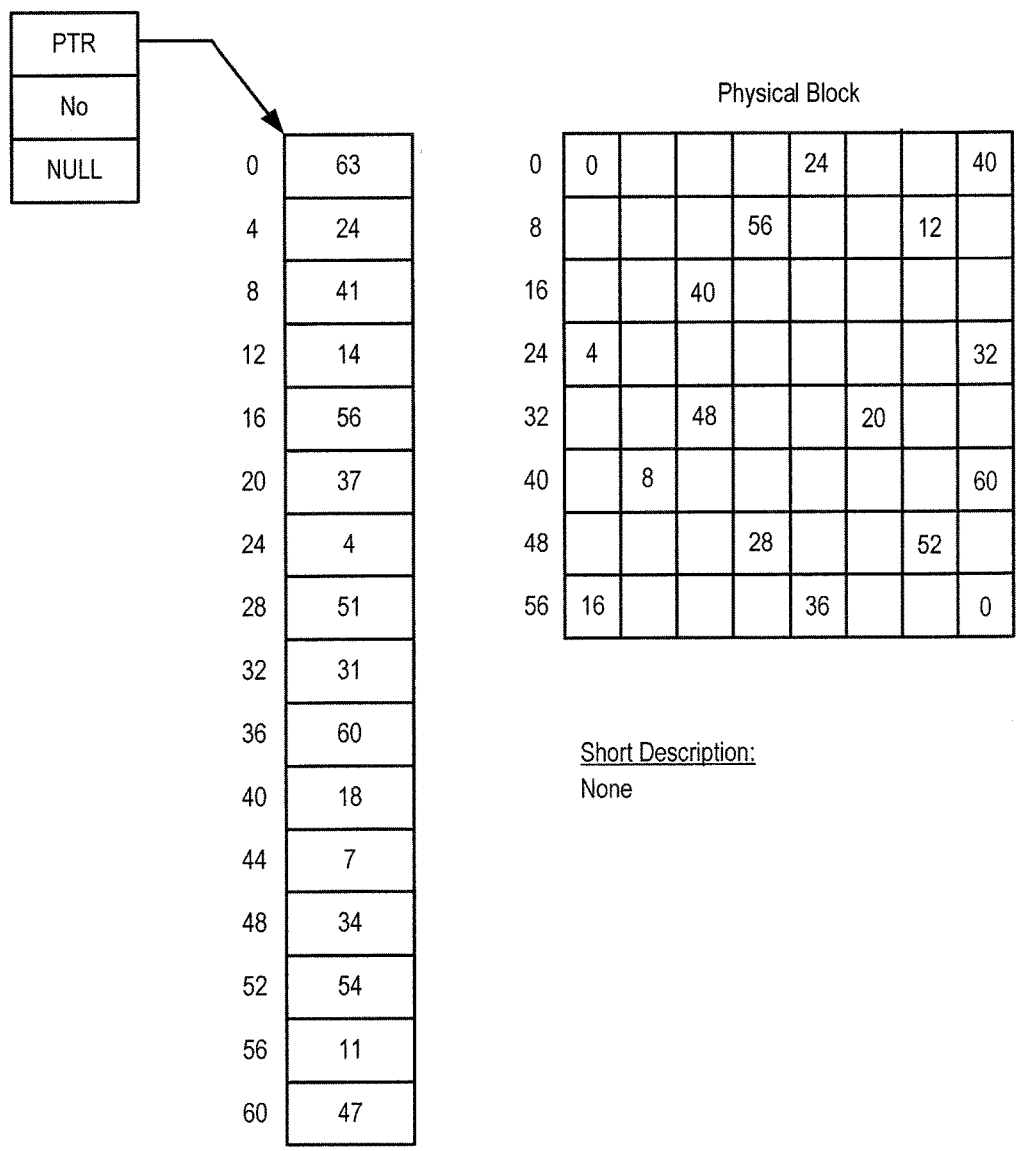
FIG. 5 is an illustration of an embodiment of a random writing situation.
Figure 6:
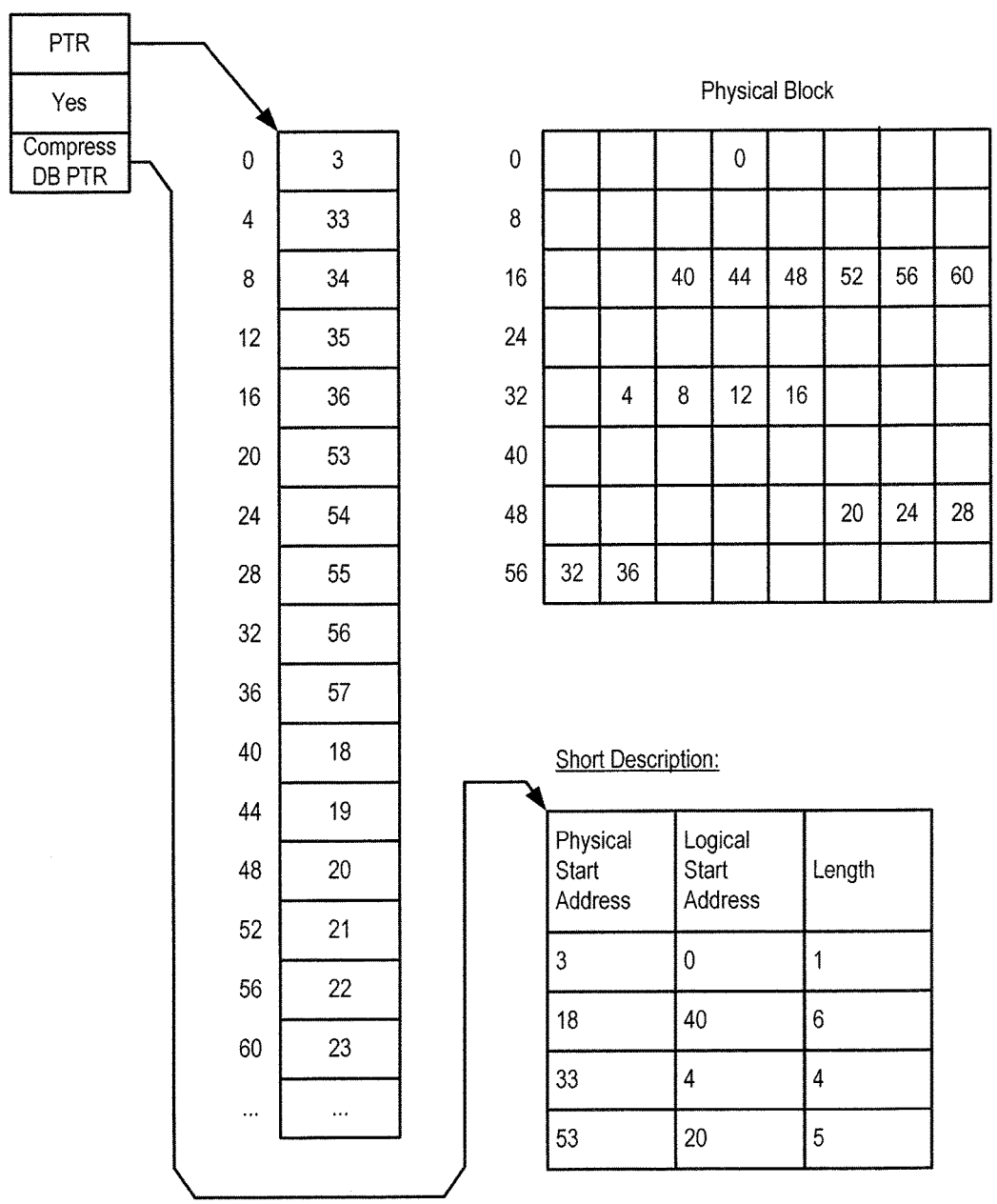
FIG. 6 is an illustration showing a compressed database of an embodiment in a semi-sequential writing situation.

Turning now to FIG. 4, FIG. 4 shows the content of the cached logical-to-physical address table and the physical block of non-volatile memory 104 after logical addresses 1-64 are sequentially written in the physical block. Each physical location in the physical block shows the starting logical address stored in that location. Note, the numbers in the physical block in FIG. 3 enumerate each of the 64 physical locations in the physical block, whereas the numbers in the physical block in FIGS. 4-6 represent the starting logical address stored in each physical location in the block (although the numbers on the sides of the physical block represents the started physical address for each row). That is, the physical block in FIGS. 4-6 show the reverse association to logical addresses.

The cached logical-to-physical address table shows that logical address 0 is mapped to physical address 0, logical address 4 is mapped to physical address 1, etc. Because the logical addresses were written sequentially in this example, a compressed version of the logical-to-physical address table can be used and cached instead of (or in addition to) the logical-to-physical address table (in whole or in part). This compressed database is referred to in FIG. 4 as the "short description" and contains the physical start address, logical start address, and physical length. The compressed database can be a very efficient way to describe the physical location of the data. It should be noted that "compressed" in this context refers to the fact that the database is a smaller version of the logical-to-physical address table. For example, for a 64 GB physical block, the logical-to-physical address table can be 64 MB, whereas the compressed version (short description) can just be several KB. It should be noted that "compressed" does not necessarily mean that the database itself was the result of a data compression technique used to make the database itself smaller from an original, larger size (although such data compression of the "compressed database" can be performed). Also, while the term "database" is used in these examples, it should be understood that any appropriate data structure (e.g., table, tree, list, chart, etc.) can be used.

Returning to the compressed database (short description) shown in FIG. 4, this database shows that, starting at physical address 0, the physical block stores 16 consecutive logical addresses, starting at logical address 0. So, in this illustration, the entire logical-to-physical address table is compressed to a single entry in the short description (compressed) database. Because a compressed database can be used to represent what is stored in the physical block, the compress bit is set to "yes," and the compress database pointer points to the compressed database. The controller 104 can use this information to determine what to use for address translation.

FIG. 5 is an illustration showing a compressed database of an embodiment in a random writing situation. Because the physical block does not store a sequential run of logical addresses (e.g., there are no adjacent physical locations in the block that store sequential logical address sets), there is no practical way of having a compressed database, as the "short description" would contain one entry for each physical location, same as the logical-to-physical address table.

FIG. 6 is an illustration of a semi-sequential writing situation in which there are several sections of consecutive writings (four in this example). This situation is "semi-sequential" because even though the physical block locations may have been written non-sequentially, after the writing is complete, sequential runs of logical addresses can be observed. As shown in FIG. 6, the end result of the writing is that there is one block with one logical address set (i.e., physical location 3 stores the data in logical addresses 0-4), and there are three sequential runs of logical addresses (i.e., physical addresses 18-23 store the data in logical addresses 40-64, physical addresses 33-36 store the data in logical addresses 4-20, and physical addresses 53-57 store the data in logical addresses 20-40). As such, the compressed database representing the entire logical-to-physical address table can be represented by database having four entries, as shown in the short description in FIG. 6.

Figure 7:
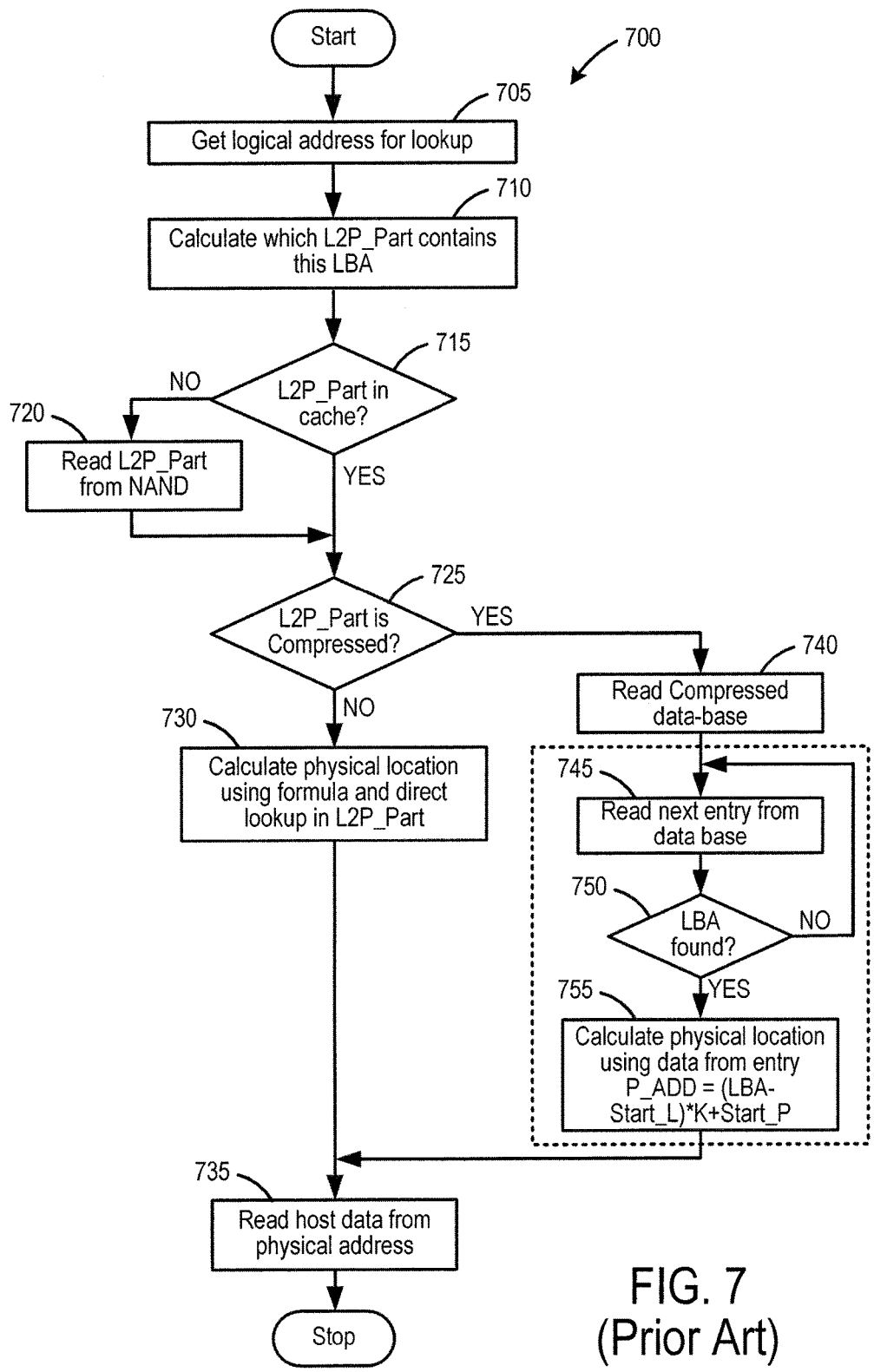
FIG. 7 is a flowchart of a prior art method for searching a compressed database.

As mentioned above, searched a compressed version of the logical-to-physical address table can be faster than searching the entire logical-to-physical address table. As also mentioned above, various search algorithms can be used to analyze each entry in a compressed database to determine which entry contains a logical address of interest and then what physical address maps to that logical address. FIG. 7 is a flow chart 700 of a prior search algorithm, which can be implemented, for example, in firmware of a storage system. As shown in FIG. 7, various steps are first taken to load the logical-to-physical address table (or a compressed version of it) from the non-volatile memory to volatile memory. Specifically, in this example, the controller of the storage system gets the logical address (e.g., a logical block address (LBA)) for the lookup (e.g., from a read or write command from a host) (act 705), calculates which part of the logical-to-physical address table stored in non-volatile memory contains the logical address (act 710), and then determines if that part is already cached in the volatile memory (act 715). If the part is not already cached, the controller reads that part from non-volatile memory and caches it in volatile memory (act 720). The controller then determines whether the cached table is compressed or not (act 725). If the cached table is not compressed, the controller calculates the physical location using a formula and direct lookup in the table (act 730). If the cached table is compressed, the controller reads the compressed table/database (act 740) and then loops through the entries one-by-one until it finds the logical address in question (acts 745 and 750). The controller then calculates the physical address from the entry using a formula (act 755) and then reads the host data from the physical address (act 735).

Because this search algorithm searches entries in the compressed database one-by-one until it finds the logical address, the time needed to search the compressed database can vary based on where the logical address is stored in the compressed database and how many entries are in the compressed database. For example, the search algorithm takes longer if the logical address is found in the last entry of the compressed database rather than the first entry. Also, the more entries in the compressed database, the longer the search time can be. The search duration can also depend on the type of search algorithm (e.g., one that uses a linear tree versus a binary tree) and controller/CPU capabilities.

In one embodiment, the long and tedious search algorithm discussed above is replaced by a more-efficient solution that operates on a different type of compressed database. For example, instead of each entry in the compressed database storing the physical start address, logical start address, and length of a sequential run of logical addresses, each entry in the compressed database of this embodiment stores a start physical address and start and end logical addresses for a sequential run of logical addresses. That is, as compared to the compressed database discussed above, the length of the sequential run of logical addresses is removed from the compressed database in this embodiment, and the end logical addresses is added. Entries in the compressed database of this embodiment can optionally contain other items of information, such as the physical end address.

Figure 8:
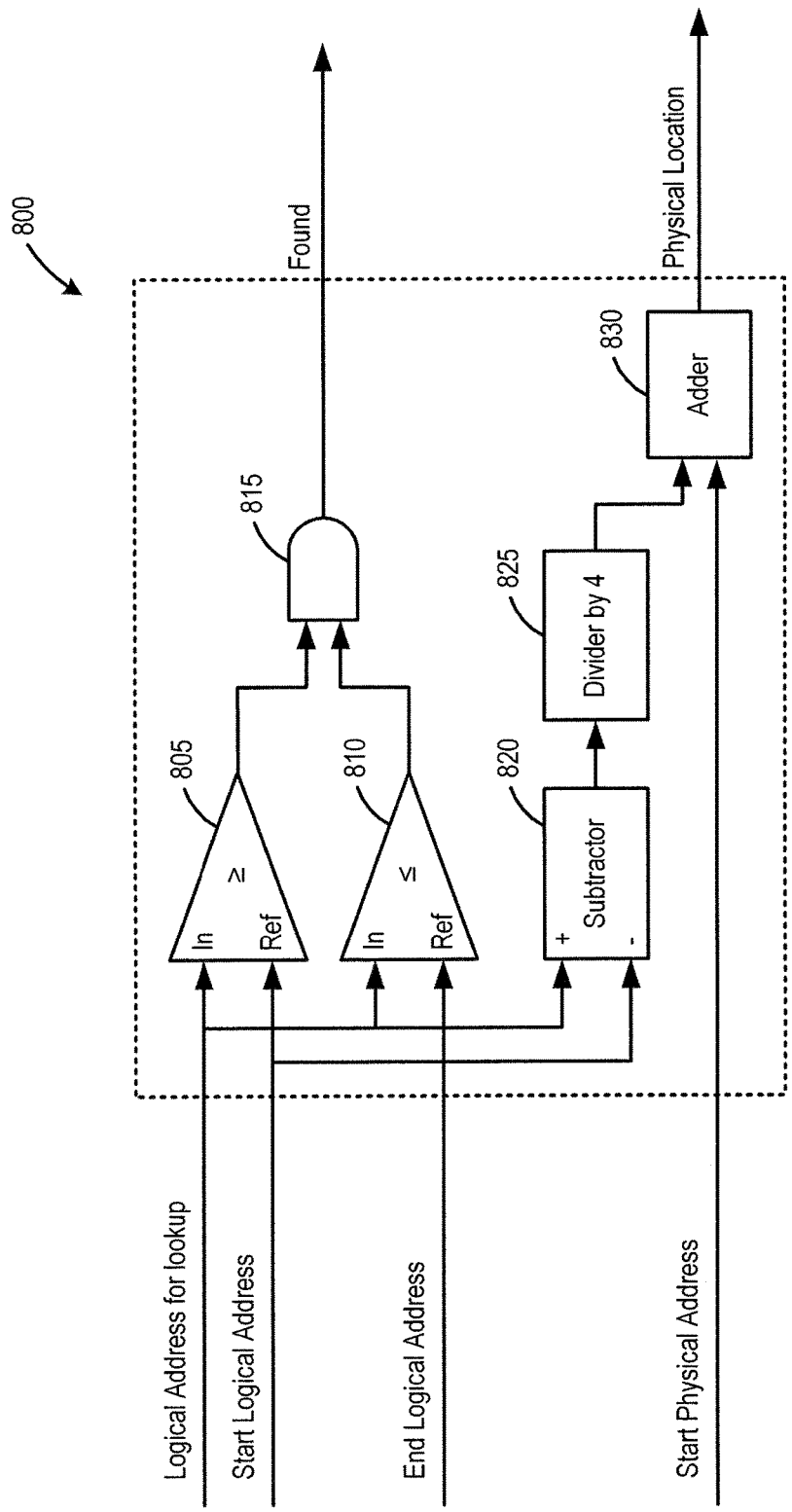
FIG. 8 is a block diagram illustrating an example of search circuitry of an embodiment.
Figure 9:
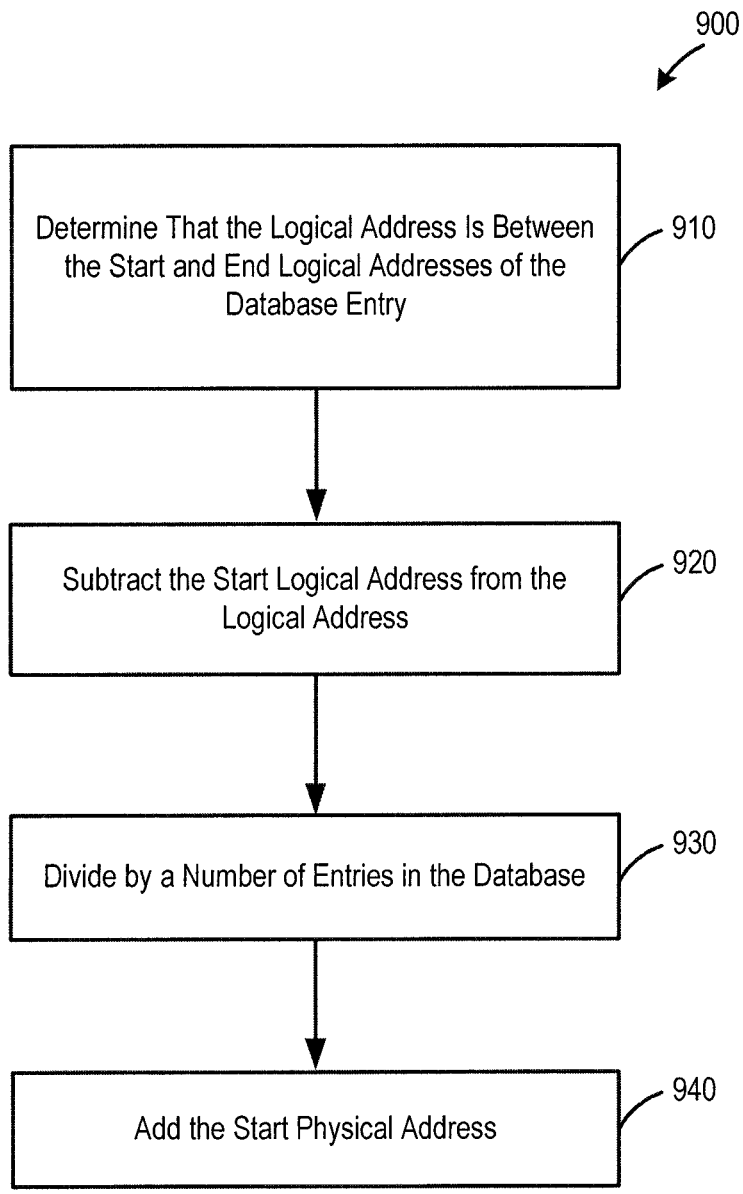
FIG. 9 is a flowchart of a method of an embodiment for fast lookup in a table-caching database.

FIG. 8 is an example of search circuitry 800 of this embodiment. As shown in FIG. 8, the search circuitry 800 of this embodiment comprises two comparators 805, 810, an AND gate 815, a subtractor 820, a divider 825, and an adder 830. It should be understood that this is just an example, and other implementations can be used. Also, while this search circuitry is shown as hardware components in FIG. 8, some or all of the functions shown therein can be implemented as software. Also, in one embodiment, this search circuitry is part of the controller 102 (e.g., part of the compressed database lookup module 111 shown in FIG. 2A), while, in other embodiments, the search circuitry is located outside of the controller 102. The operation of this search circuitry 800 will be discussed below and in conjunction with the flow chart 900 in FIG. 9.

In operation, the first comparator 805 takes a logical address for lookup and compares it to the start logical address for a stored sequential run of logical addresses. At the same time, the second comparator 810 compares the logical address for lookup with the end logical address of the sequential run. Both of these comparisons happen in parallel, and the output of these comparators 805, 810 is provided to the AND gate 815. Essentially, these components work to determine if the logical address for lookup is in the sequential run of logical addresses in an entry in the compressed database (act 910). If it is, the AND gate outputs a logical 1, which indicates that the logical address for lookup is found in that entry. As same time, the subtractor 82, divider 825, and adder 830 operate to generate the physical address by subtracting the start logical address from the logical address for lookup (act 920), then dividing that amount by four (because four is the level of granularity of logical addresses to a physical storage location in this embodiment) (act 930), and then adding that amount to the start physical address (act 940).

In one embodiment, the search circuitry 800 in FIG. 8 is repeated for every entry in the cached database, so the searching of the database happens in parallel. Also, because the operations of each search circuitry happen in parallel and within a fixed time, this approach provides a deterministic search solution. That is, as compared to the prior search algorithm discussed above, which has a flexible search time, this embodiment uses a fast and deterministic-in-time search technique because the search stages occur in parallel and need the same amount of time. An example of this embodiment will now be illustrated in the circuit 1000 of FIG. 10.

Figure 10:
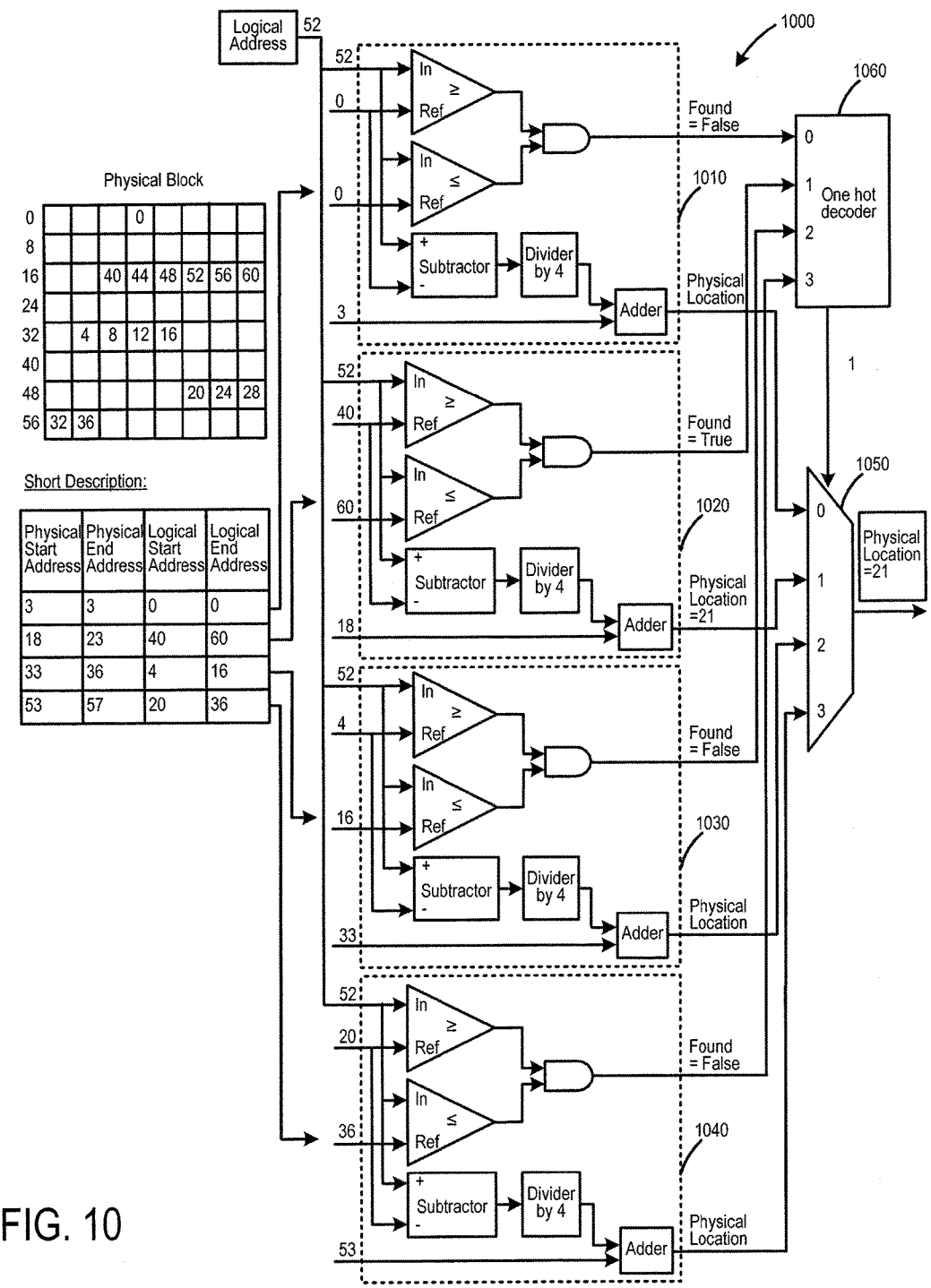
FIG. 10 is a block diagram illustrations circuitry of an embodiment for searching a compressed database.

As shown the example in FIG. 10, the compressed database contains four entries, and there are four search circuitries 1010, 1020, 1030, 1040, one for each entry. The outputs of the four search circuitries are provided to a multiplexor 1050, whose output selection is dictated by a one hot decoder 1060. In operation, each search circuity 1010, 1020, 1030, 1040 operates in parallel and as described above with respect to FIG. 8. As each search circuitry provides a physical location output irrespective of whether the output of the AND gate is true or false, the multiplexor 1050 is used to output only the physical address of the search circuity that actual found the logical address of interest in an entry. This is done by having the outputs of all the AND gates feed into the one hot decoder 1060, so the one hot decoder 1060 will select the input of the multiplexor based on which search circuitry output a true found signal. FIG. 10 is annotated to show how a search for logical address 52 would be handled for a sample compressed database.

There are several advantages associated with these embodiments. For example, because the compressed table caching database search of these embodiments is performed in parallel (e.g., the entries are searched in parallel) and in a deterministic manner (e.g., each entry is searched in the same, fixed time), these embodiments can be used to improve of random read performance of storage devices, which is an important metric in mobile benchmarks. That is, unlike prior search algorithms that have a flexible searching time, these embodiments provide a predictive searching time.

Finally, as mentioned above, any suitable type of memory can be used. Semiconductor memory devices include volatile memory devices, such as dynamic random access memory ("DRAM") or static random access memory ("SRAM") devices, non-volatile memory devices, such as resistive random access memory ("ReRAM"), electrically erasable programmable read only memory ("EEPROM"), flash memory (which can also be considered a subset of EEPROM), ferroelectric random access memory ("FRAM"), and magnetoresistive random access memory ("MRAM"), and other semiconductor elements capable of storing information. Each type of memory device may have different configurations. For example, flash memory devices may be configured in a NAND or a NOR configuration.

The memory devices can be formed from passive and/or active elements, in any combinations. By way of non-limiting example, passive semiconductor memory elements include ReRAM device elements, which in some embodiments include a resistivity switching storage element, such as an anti-fuse, phase change material, etc., and optionally a steering element, such as a diode, etc. Further by way of non-limiting example, active semiconductor memory elements include EEPROM and flash memory device elements, which in some embodiments include elements containing a charge storage region, such as a floating gate, conductive nanoparticles, or a charge storage dielectric material.

Multiple memory elements may be configured so that they are connected in series or so that each element is individually accessible. By way of non-limiting example, flash memory devices in a NAND configuration (NAND memory) typically contain memory elements connected in series. A NAND memory array may be configured so that the array is composed of multiple strings of memory in which a string is composed of multiple memory elements sharing a single bit line and accessed as a group. Alternatively, memory elements may be configured so that each element is individually accessible, e.g., a NOR memory array. NAND and NOR memory configurations are examples, and memory elements may be otherwise configured.

The semiconductor memory elements located within and/or over a substrate may be arranged in two or three dimensions, such as a two dimensional memory structure or a three dimensional memory structure.

In a two dimensional memory structure, the semiconductor memory elements are arranged in a single plane or a single memory device level. Typically, in a two dimensional memory structure, memory elements are arranged in a plane (e.g., in an x-z direction plane) which extends substantially parallel to a major surface of a substrate that supports the memory elements. The substrate may be a wafer over or in which the layer of the memory elements are formed or it may be a carrier substrate which is attached to the memory elements after they are formed. As a non-limiting example, the substrate may include a semiconductor such as silicon.

The memory elements may be arranged in the single memory device level in an ordered array, such as in a plurality of rows and/or columns. However, the memory elements may be arrayed in non-regular or non-orthogonal configurations. The memory elements may each have two or more electrodes or contact lines, such as bit lines and wordlines.

A three dimensional memory array is arranged so that memory elements occupy multiple planes or multiple memory device levels, thereby forming a structure in three dimensions (i.e., in the x, y and z directions, where the y direction is substantially perpendicular and the x and z directions are substantially parallel to the major surface of the substrate).

As a non-limiting example, a three dimensional memory structure may be vertically arranged as a stack of multiple two dimensional memory device levels. As another non-limiting example, a three dimensional memory array may be arranged as multiple vertical columns (e.g., columns extending substantially perpendicular to the major surface of the substrate, i.e., in the y direction) with each column having multiple memory elements in each column. The columns may be arranged in a two dimensional configuration, e.g., in an x-z plane, resulting in a three dimensional arrangement of memory elements with elements on multiple vertically stacked memory planes. Other configurations of memory elements in three dimensions can also constitute a three dimensional memory array.

By way of non-limiting example, in a three dimensional NAND memory array, the memory elements may be coupled together to form a NAND string within a single horizontal (e.g., x-z) memory device levels. Alternatively, the memory elements may be coupled together to form a vertical NAND string that traverses across multiple horizontal memory device levels. Other three dimensional configurations can be envisioned wherein some NAND strings contain memory elements in a single memory level while other strings contain memory elements which span through multiple memory levels. Three dimensional memory arrays may also be designed in a NOR configuration and in a ReRAM configuration.

Typically, in a monolithic three dimensional memory array, one or more memory device levels are formed above a single substrate. Optionally, the monolithic three dimensional memory array may also have one or more memory layers at least partially within the single substrate. As a non-limiting example, the substrate may include a semiconductor such as silicon. In a monolithic three dimensional array, the layers constituting each memory device level of the array are typically formed on the layers of the underlying memory device levels of the array. However, layers of adjacent memory device levels of a monolithic three dimensional memory array may be shared or have intervening layers between memory device levels.

Then again, two dimensional arrays may be formed separately and then packaged together to form a non-monolithic memory device having multiple layers of memory. For example, non-monolithic stacked memories can be constructed by forming memory levels on separate substrates and then stacking the memory levels atop each other. The substrates may be thinned or removed from the memory device levels before stacking, but as the memory device levels are initially formed over separate substrates, the resulting memory arrays are not monolithic three dimensional memory arrays. Further, multiple two dimensional memory arrays or three dimensional memory arrays (monolithic or non-monolithic) may be formed on separate chips and then packaged together to form a stacked-chip memory device.

Associated circuitry is typically required for operation of the memory elements and for communication with the memory elements. As non-limiting examples, memory devices may have circuitry used for controlling and driving memory elements to accomplish functions such as programming and reading. This associated circuitry may be on the same substrate as the memory elements and/or on a separate substrate. For example, a controller for memory read-write operations may be located on a separate controller chip and/or on the same substrate as the memory elements.

One of skill in the art will recognize that this invention is not limited to the two dimensional and three dimensional structures described but cover all relevant memory structures within the spirit and scope of the invention as described herein and as understood by one of skill in the art.

It is intended that the foregoing detailed description be understood as an illustration of selected forms that the invention can take and not as a definition of the invention. It is only the following claims, including all equivalents, that are intended to define the scope of the claimed invention. Finally, it should be noted that any aspect of any of the embodiments described herein can be used alone or in combination with one another.

What is claimed is:

1. A storage system comprising:
a volatile memory;
a non-volatile memory; and
a controller in communication with the volatile memory and the non-volatile memory, wherein the controller is configured to:
store, in the volatile memory, a data structure representing a compressed version of a logical-to-physical address table stored in the non-volatile memory, wherein each entry in the data structure comprises a start physical address and start and end logical addresses for a sequential run of logical addresses; and
search each entry in the data structure in parallel for a physical address associated with a logical address, wherein:
the searching comprises (i) simultaneously comparing the logical address both to the start logical address and to the end logical address in each entry and (ii) calculating a physical address associated with the logical address, wherein (i) and (ii) are performed in parallel, and
each entry in the data structure is searched in a same amount of time.

2. The storage system of claim 1, wherein the controller is further configured to calculate the physical address by:
subtracting the start logical address from the logical address;
dividing by a number of entries in the data structure; and
adding the start physical address.

3. The storage system of claim 1, wherein the non-volatile memory comprises a three-dimensional memory.

4. The storage system of claim 1, wherein the storage system is embedded in a host.

5. A method for searching a cached, compressed database representing a logical-to-physical address table, the method comprising:
performing the following in a storage system comprising a volatile memory:
caching, in the volatile memory, a compressed database representing a logical-to-physical address table, wherein each entry in the compressed database comprises a start physical address and start and end logical addresses for a sequential run of logical addresses; and
searching each entry in the cached, compressed database in parallel for a logical address, wherein the searching comprises (i) simultaneously comparing the logical address both to the start logical address and to the end logical address in each entry and (ii) calculating a physical address associated with the logical address, wherein (i) and (ii) are performed in parallel, wherein each entry requires a same amount of time to search.

6. The method of claim 5, wherein the physical address is calculated by:
subtracting the start logical address from the logical address;
dividing by a number of entries in the cached, compressed database; and
adding the start physical address.

7. The method of claim 5, wherein the storage system further comprises a three-dimensional non-volatile memory.

8. The method of claim 5, wherein the storage system is removably connectable to a host.

9. A storage system comprising:
a volatile memory;
a non-volatile memory;
means for storing, in the volatile memory, a data structure representing a compressed version of a logical-to-physical address table stored in the non-volatile memory, wherein each entry in the data structure comprises a start physical address and start and end logical addresses for a sequential run of logical addresses; and
means for searching each entry in the data structure in parallel for a physical address associated with a logical address, wherein the searching comprises (i) simultaneously comparing the logical address both to the start logical address and to the end logical address in each entry and (ii) calculating a physical address associated with the logical address, wherein (i) and (ii) are performed in parallel, wherein each entry in the data structure is searched in a same amount of time.

10. The storage system of claim 9, wherein:
the means for searching comprises a plurality of search circuitry in communication with a decoder and a multiplexor; and
each entry of the data structure is associated with its own search circuitry.

11. The storage system of claim 10, wherein at least one search circuitry comprises a comparator, an AND gate, a subtractor, a divider, and an adder.

12. The storage system of claim 9, wherein the non-volatile memory comprises a three-dimensional memory.

13. The storage system of claim 9, wherein the storage system is embedded in a host.

* * * * *